(12) United States Patent
Feng et al.

(10) Patent No.: US 8,062,910 B1
(45) Date of Patent: Nov. 22, 2011

(54) MEASUREMENT OF A SAMPLE USING MULTIPLE MODELS

(75) Inventors: Ye Feng, Santa Clara, CA (US); Zhuan Liu, Fremont, CA (US)

(73) Assignee: Nanometrics Incorporated, Milpitas, CA (US)

( * ) Notice: Subject to any disclaimer, the term of this patent is extended or adjusted under 35 U.S.C. 154(b) by 288 days.

(21) Appl. No.: 12/270,776

(22) Filed: Nov. 13, 2008

Related U.S. Application Data

(62) Division of application No. 11/173,315, filed on Jun. 30, 2005, now Pat. No. 7,465,590.

(51) Int. Cl.
*G01R 31/26* (2006.01)

(52) U.S. Cl. ............... 438/14; 438/18; 257/E21.521

(58) Field of Classification Search ........... 438/14–50, 438/404, 459, 692; 257/E21.022, E21.53, 257/E21.122, E21.252, E21.577
See application file for complete search history.

(56) References Cited

U.S. PATENT DOCUMENTS

| | | | |
|---|---|---|---|
| 5,981,395 A | 11/1999 | Huang et al. | |
| 6,528,387 B1 | 3/2003 | Moriyasu et al. | |
| 6,640,151 B1 | 10/2003 | Somekh et al. | |
| 6,657,736 B1 | 12/2003 | Finarov et al. | |
| 6,670,200 B2 | 12/2003 | Ushio et al. | |
| 2004/0063224 A1* | 4/2004 | Paik | 438/5 |
| 2004/0203177 A1 | 10/2004 | Davis et al. | |

OTHER PUBLICATIONS

"Dielectric CMP Process Control"; European Semiconductor, Apr. 1998, pp. 43-50.
Alexander E. Braun, "Metrology Develops to Measure Thinner Films Better", Semiconductor International, Oct. 1, 2004, 7 pgs.

* cited by examiner

*Primary Examiner* — Walter L Lindsay, Jr.
*Assistant Examiner* — Abdulfattah Mustapha
(74) *Attorney, Agent, or Firm* — Silicon Valley Patent Group LLP

(57) ABSTRACT

A sample that is processed to remove a top layer, e.g., using chemical mechanical polishing or etching, is accurately measured using multiple models of the sample. The multiple models may be constrained based on a pre-processing measurement of the sample. By way of example, the multiple models of the sample may be linked in pairs, where one pair includes a model simulating the pre-processed sample and another model simulating the post-processed sample with a portion of the top layer remaining, i.e., under-processing. Another pair of linked models includes a model simulating the pre-processed sample and a model simulating the post-processing sample with the top layer removed, i.e., the correct amount of processing or over-processing. The underlying layers in the linked model pairs are constrained to have the same parameters. The modeling process may use a non-linear regression or libraries.

25 Claims, 3 Drawing Sheets

MEASUREMENT OF A SAMPLE USING MULTIPLE MODELS

CROSS REFERENCE TO RELATED APPLICATIONS

This application is a divisional of U.S. patent application Ser. No. 11/173,315, filed Jun. 30, 2005, entitled "Measurement of a Sample Using Multiple Models," which is incorporated herein by reference in its entirety.

FIELD OF THE INVENTION

The present invention relates to metrology and in particular to measuring parameters, such as thickness, of layers on a sample.

BACKGROUND

In semiconductor manufacturing processing, layers of material on wafers are built up and selectively removed. For example, small portions of layers may be removed using a selective etching process, e.g., using a photolithographic process. Other times, the wafers are processed to planarize the surface of the wafer. Without uniform surfaces, an accurate circuit pattern cannot be obtained from the next photolithographic process. In order to planarize the surface of a wafer, chemical mechanical polishing (CMP) is often used. During CMP, the wafer is spun or rotated while it is pushed toward a polishing pad, which is sprayed with a slurry, i.e. a suspension which includes inorganic particles and surfactants. The wafer surface is polished flat through the combination of mechanical friction between the wafer and suspension and chemical dissolution reaction of the suspension.

Accurate measurement of the layers on the wafer during or after processing is important to ensure the proper amount of polishing or etching of the materials. By way of example, end point detection is used with CMP processing to determine when the desired amount of material has been removed. Spectroscopic reflectometry or other types of non-destructive optical metrology is often used to determine the thicknesses of the layers after processing. To determine the thickness of layers (or other desired parameters of the layers), conventional modeling techniques are often used, in which the thicknesses of the top layer and the underlying layers are varied until an acceptable match between the modeled data and the measured data is achieved. Unfortunately, the thicknesses of some materials, such as oxide and nitride, exhibit strong correlation particularly near the end-point. Accurate and precise measurement of strongly correlated thicknesses using conventional methods is difficult.

Accordingly, what is needed is an improved metrology method, e.g., which can measure strongly correlated thicknesses or other parameters.

SUMMARY

The present invention accurately measures the layers on a sample, e.g., which is processed to remove a top layer using chemical mechanical polishing or etching. The sample is modeled using a model that simulates the sample with a portion of the top layer remaining and another model that simulates the sample with the top layer removed. Models of the pre-processed sample may also used with the models of the post-processed sample.

In one implementation, a method includes processing a sample that has at least a first layer and a second layer under the first layer to at least partially remove the first layer, which produces a post-processed sample. A post-processing measurement is performed on the post-processed sample. The post-processed sample is modeled with a first model, which models the first layer as an independent variable and models the second layer. The post-processed sample is also modeled with a second model, which models the first layer as having a thickness of zero and models the second layer as an independent variable. The post-processing measurement, first model and second model are used to determine at least one desired parameter of the post-processed sample.

In another implementation, a method of measuring a sample includes performing a first measurement of a sample, which has a first layer and an underlying second layer. The sample is then processed to at least partially remove the first layer. A second measurement of the sample after processing is then performed. The sample is modeled using a first pair of linked models, which include a first model of the pre-processed sample and a second model of the post-processed sample. The first layer of the first model and the first layer of the second model are independent variables and the second layer of the first model and the second layer of the second model are constrained to have the same parameters. The sample is also modeled using a second pair of linked models, which include a third model of the pre-processed sample and a fourth model of the post-processed sample. The first layer of the third model is an independent variable, the first layer of the fourth model has a thickness of zero, the second layer of the third model and the second layer of the fourth model are independent variables. The first measurement, the second measurement, the first model, the second model, the third model, and the fourth model are used to determine at least one desired parameter of the post-processed sample.

In yet another implementation, a method of measuring a sample includes performing a first measurement of a sample, which has a first layer and an underlying second layer. The sample is then processed to at least partially remove the first layer. A second measurement of the sample after processing is then performed. The post-processed sample is modeled with a first model and the second measurement, the first model modeling the first layer as an independent variable and constraining the modeling of the second layer based on the first measurement. The post-processed sample is also modeled with a second model and the second measurement, the second model models the first layer as having a thickness of zero and models the second layer as an independent variable. The first measurement, second measurement, first model and second model are used to determine at least one parameter of the post-processed sample.

In yet another implementation a sample with multiple layers is processed to at least partially remove the top layer to produce a post-processed sample. The post-processed sample is measured using a non-contact measurement. Multiple post-processing models of the post-processed sample are generated. Each of the multiple post-processing models models the post-processed sample with a different top layer, where the top layer of each of the multiple post-processing models is an independent variable. The post processing measurement and the multiple post-processing models are then used to determine at least one desired parameter of the post-processed sample.

DETAILED DESCRIPTION

Figure 1:
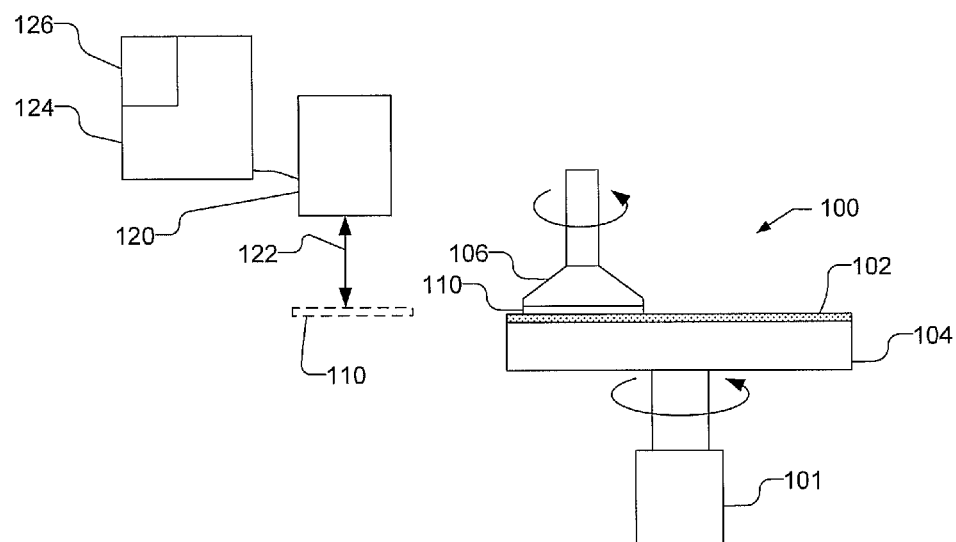
FIG. 1 illustrates a chemical mechanical polishing (CMP) system and metrology system that may be used with the present invention.

FIG. 1 illustrates a chemical mechanical polishing (CMP) system 100 that may be used with the present invention. The CMP system 100 includes a polishing pad 102 affixed to a polishing plate 104. A wafer 110 is mounted to a polishing head 106 and pressed against the polishing pad 102. The polishing plate 104 and polishing head 106 are rotated to produce relative motion between the wafer 110 and the polishing pad 102. A slurry (not shown) is provided on the polishing pad 102 and is used to assist in the polishing of the top layer on the wafer 110.

A metrology system 120 is used with CMP system 100 to determine the thicknesses of the layers on wafer 110. The metrology system 120 may be a separate stand alone system in which the wafer 110 must be removed from the CMP system 100, as illustrated in FIG. 1, or an in-situ system in which the wafer 110 is examined while in the CMP system 100. As illustrated in FIG. 1, the wafer 110 is removed from the CMP system 100 and positioned (as illustrated by the broken lines) with respect to the metrology system 120 so that the metrology system 120 can illuminate the wafer 110a. It should be understood, however, that the present invention is not limited by the specific location and configuration of the metrology system 120.

The metrology system 120 may be, e.g., a spectroscopic reflectometer, ellipsometer, spectroscopic ellipsometer, scatterometer, or any other metrology device that is capable of measuring the layers of interest on the wafer 110. As illustrated in FIG. 1, metrology system 120 produces a beam 122 of light that is incident on and reflected by the wafer 110. The reflected light is received by the metrology system 120, which provides a signal to a processor 124. The processor 124 may be, e.g., a workstation, a personal computer, or central processing unit, e.g., Pentium 4™ or other adequate computer system. Processor 124 includes a computer-usable medium 126 having computer-readable program code embodied therein for measuring the layers on the wafer 110 using models, in accordance with the present invention. Generating code to generate models and measure the layers on the wafer is well within the abilities of those skilled in the art in light of the present disclosure.

The processor 124 may be coupled to the CMP system 100 as process control. Thus, for example, where the measurement of the wafer 110 indicates that the wafer 110 is under-polished, the processor 124 may provide process controls to the CMP system 100 to polish the wafer 110 for an additional time period. The processor 124 may also provide feedback to the CMP system 100 to control the polishing of subsequent wafers.

Figures 2A, 2B:
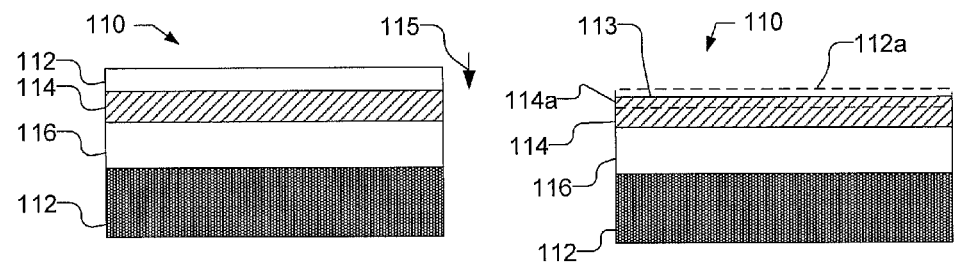
FIG. 2A illustrates a cross-sectional view of a portion of a sample to be polished, e.g., by the CMP system shown in FIG. 1.
FIG. 2B illustrates a cross-sectional view of a portion of the wafer after polishing.

FIG. 2A illustrates a cross-sectional view of a portion of a wafer 110 to be polished, e.g., by CMP system 100. Wafer 110 includes, e.g., a substrate 112 and a plurality of layers including a top layer, referred to herein as first layer 112, an underlying second layer 114, and an underlying third layer 116. By way of example, the layers 112, 114, and 116 may be an oxide/nitride/oxide structure. As indicated by the arrow 115, the first layer 112 is to be polished back to the second layer 114 by the CMP system 100. It should be understood that FIG. 2A is merely for illustrative purposes and that the structure may include additional underlying or overlying layers.

FIG. 2B illustrates a cross-sectional view of a portion of the wafer 110 after polishing. Ideally, the top layer 112 is polished back to the interface 113 between layer 112 and underlying layer 114. However, as illustrated in FIG. 2B, if the wafer 110 is under-polished a portion 112a of the top layer will remain. If, however, the wafer is over-polished, a portion 114a of the underlying layer 114 will be removed.

Figure 2C:
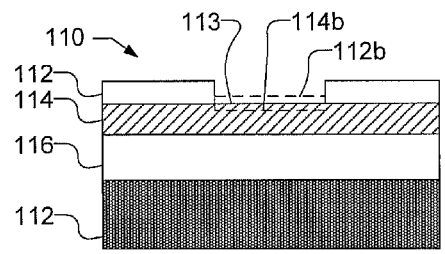
FIG. 2C illustrates a cross-sectional view of a portion of the wafer after a portion of the top layer is etched back to the underlying layer.

While the present invention is described with reference to CMP polishing and a specific oxide/nitride/oxide structure, it should be understood that the present invention is not limited thereto. For example, FIG. 2C illustrates a cross-sectional view of a portion of the wafer 110 after a portion of the top layer 112 is etched back to the underlying layer 114. Ideally, the top layer 112 is etched back to the interface 113 between layer 112 and underlying layer 114. However, as illustrated in FIG. 2C, if the wafer 110 is under-etched a portion 112b of the top layer will remain. If, however, the wafer is over-etched, a portion 114b of the underlying layer 114 will be removed.

Further, the present invention may be used with alternative structures than illustrated in FIGS. 2A, 2B, and 2C, and the numbers of layers used in the structure may be altered. Moreover, it should be understood that the present invention is not limited to measuring the thicknesses of layers, but may be used to measure other optical characteristics, such as the refractive index n and the extinction coefficient k of different layers on a sample or parameters in parametric models of the refractive index n and the extinction coefficient k.

In accordance with the present invention, a measurement of the sample that is made prior to processing, sometimes referred to herein as a "pre-measurement", is used in conjunction with a measurement of the sample that is made after processing, sometimes referred to herein as the "post-measurement", which uses multiple models of the sample.

Figure 3:
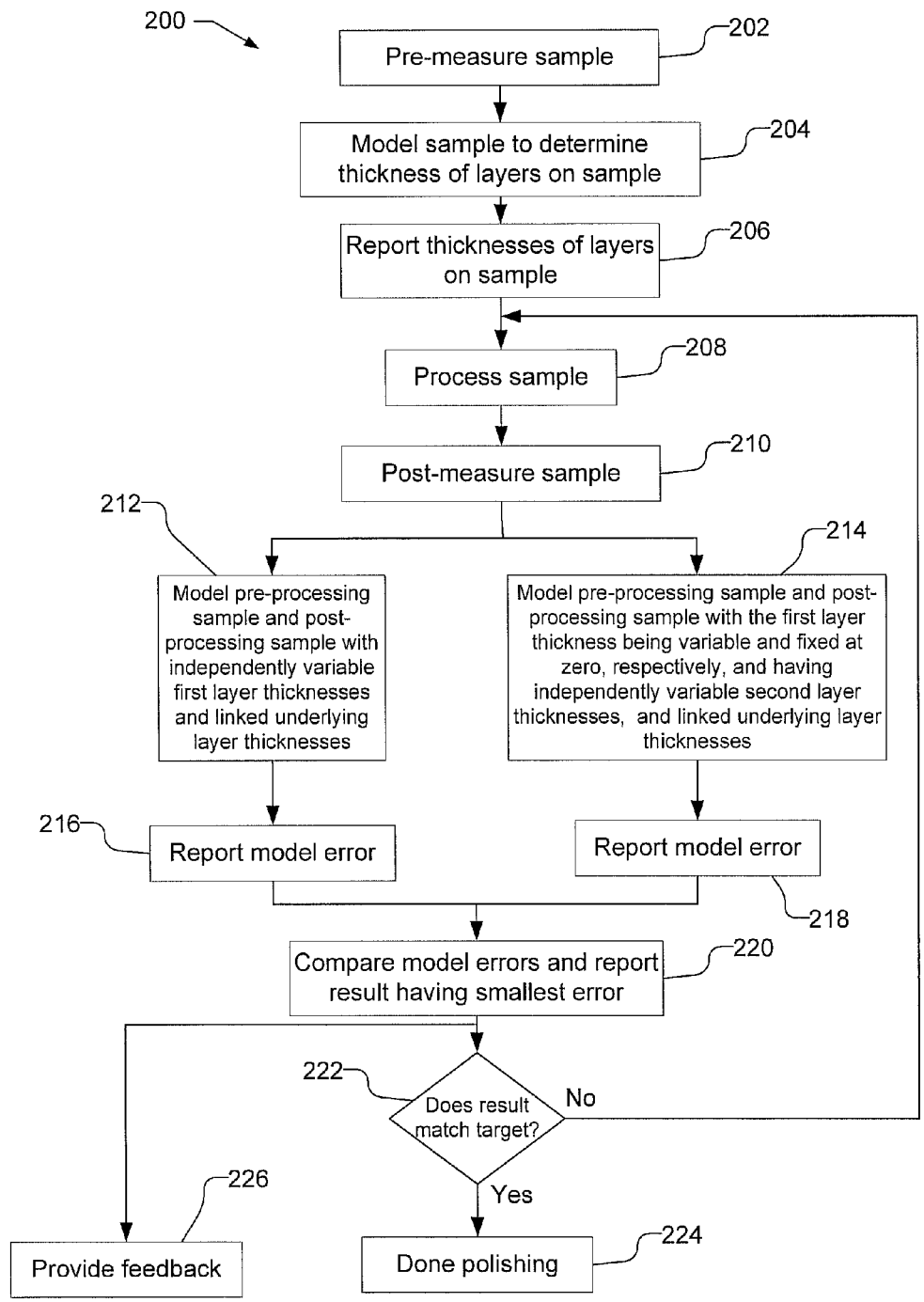
FIG. 3 is a flow chart illustrating an embodiment of the present invention in which the post-processing measurement of the sample is performed using multiple pairs of linked models of the pre-processing sample and the post-processing sample.
Figure 4A:
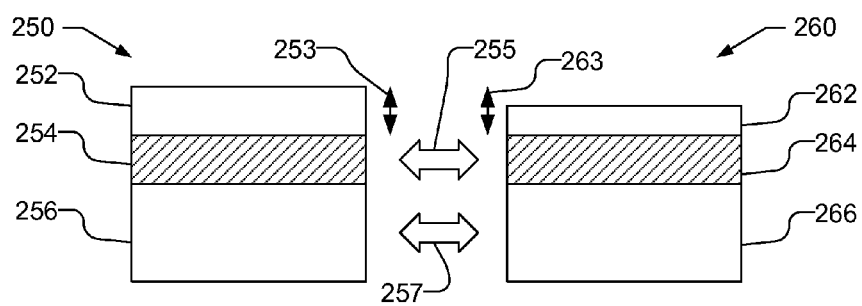
FIG. 4A illustrates a pair of linked pre-processing and post-processing models described in FIG. 3.
Figure 4B:
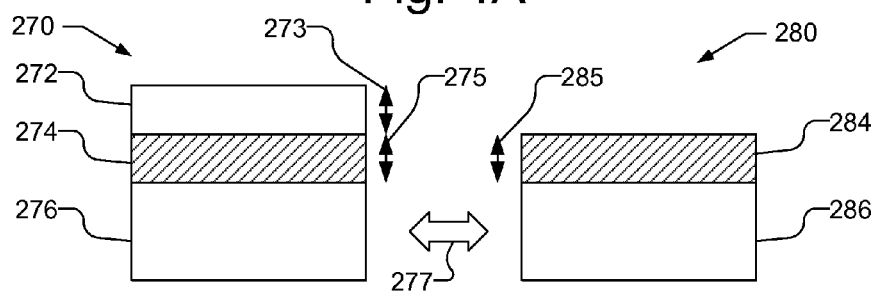
FIG. 4B illustrates a pair of linked pre-processing and post-processing models described in FIG. 3.

FIG. 3 is a flow chart 200 illustrating an embodiment of the present invention in which the post-measurement of the sample includes multiple models that use data from the pre-measurement of the sample. Instead of calculating parameters from the pre-measurement data and using that information in the post-measurement, one embodiment of the present invention links models for the pre-processing sample and the post-processing sample. The linked models are constrained such that specific parameters, e.g., the thickness of an underlying film, must be the same for both the pre-processing model and the post-measurement model. FIGS. 4A and 4B schematically illustrate the operation of the embodiment described in FIG. 3.

As illustrated in FIG. 3, prior to processing the sample, the sample is pre-measured to collect, e.g., spectroscopic data of the pre-processed sample (step 202). The pre-measurement of the sample is made, e.g., by producing radiation that is incident on the sample and collecting the radiation after it interacts with the sample, e.g., by reflection or scattering. By way of example, the sample may be measured using a spectroscopic reflectometer, ellipsometer, scatterometer or any other appropriate non-destructive metrology instrument. If desired, the sample may be modeled using conventional modeling techniques to determine the characteristics of interest of the layers on the sample, e.g., the thickness and/or the refractive index n and the extinction coefficient k (step 204) and the results reported (step 206). The measured thicknesses of the layers may be provided to the CMP system to aid in approximately calculating the required polishing time. The results from the pre-measurement, however, may not be used in the post-measurement modeling, and accordingly, the modeling and reporting steps 204 and 206 may be skipped if desired.

The sample is then processed to remove at least a portion of the top layer of the sample (step 208). By way of example, the sample may be processed using CMP or etching. After processing the sample, a post-measurement is performed (step 210), which includes modeling the sample using multiple models (212/214). The post-measurement may be performed in the same manner as the pre-measurement, e.g., using a spectroscopic reflectometer or other appropriate device. The post-measurement may be performed in-situ or with a stand alone device.

The sample is then modeled using multiple models. As is well known in the art, modeling is performed using a model that simulates the optical response of the sample under test. A model includes parameters that describe the optical constants of each layer with respect to wavelength, or tables of optical constants as functions of wavelength, and thicknesses of each layer. The values of the parameters of the sample can be determined using a model using, e.g., a fitting process, such as non-linear regression, or libraries. For example, in non-linear regression, the spectra from the model may be calculated and compared to the spectra actually measured from the sample. The thicknesses of the model's layers and optionally the parameters related to optical constants are iteratively varied and the spectra recalculated and compared to the measured spectra until a good fit is achieved. Alternatively, a library of spectra may be used in which the spectra for the model is called based on the parameters of the layers in the model. The spectra for the model is compared to the spectra actually measured, and, if necessary, additional spectra are called until a good match is achieved. Once a good match is achieved, the parameters for the model are presumed to accurately describe the sample.

The sample is modeled using multiple linked models. The pre-processed sample is modeled using the pre-measurement data and the post-processed sample is modeled using the post-measurement data and at least one parameter (thickness and/or optical constant) from each model is constrained to be the same, i.e., the thickness of the bottom layer is constrained to be the same in both models. Additionally, multiple pairs of linked models are used. One pair of linked models is used to model the sample assuming the sample has been under-processed, e.g., a portion of the top layer remains. Another pair of linked models is used to model the sample assuming the same has been over-processed, e.g., a portion of the underlying layer has been removed.

As described in flow chart 200, a first pair of linked models includes a model of the pre-processing sample and a model of the post-processing sample, with independently variable first layers, i.e., the top layers, and linked underlying layers (step 212). The first pair of linked models is used to simulate the post-processing sample assuming the sample has been under-processed, i.e., a portion of the top layer remains. As discussed above, the models in the pair are linked by constraining the parameters of the underlying layers in the models to be equal, i.e., any variation of an underlying layer in one model must also be made in the other model.

FIG. 4A illustrates the first pair of linked models. As illustrated in FIG. 4A, the first layers 252 and 262 of the pre-processing model 250 and post-processing model 260, respectively, have thicknesses that are independently variable, as indicated by arrows 253 and 263. The thicknesses of the underlying layers 254 and 256 of the pre-processing model 250 are linked to the thicknesses of the underlying layers 264 and 266 of the post-processing model 260, as indicated by arrows 255 and 257, because if the sample has been under-processed only the top layer has been changed.

As described in FIG. 3, a second pair of linked models includes a model of the pre-processing sample and a model of the post-processing sample, where the thickness of the first layer in the pre-processing model is variable and the corresponding layer in the post-processing model has a thickness of zero (step 214). Thus, the model of the post-processing sample simulates a perfectly processed or over-processed sample, i.e., the top layer has been completely removed. The thicknesses of the second layers in the model of the pre-processing sample and the model of the post-processing sample are independently variable and any layers under the second layer are linked, i.e., the thicknesses for the linked layers in the pre-processing and post-processing models must be changed together.

FIG. 4B illustrates the second pair of linked models, which includes a pre-processing model 270 and a post-processing model 280. As illustrated in FIG. 4B, the thickness of the first layer 272 of the pre-processing model 270 is an independent variable, as indicated by arrow 273 and the thickness of the first layer of the post-processing model 280 is fixed at zero, and thus, is not shown in FIG. 4B. The thicknesses of the second layers 274 and 284 are independent variables as indicated by arrow 275 and 285 because if the sample has been over-processed, the top layer has been completely removed and a portion of the second layer has been removed. The thicknesses of the underlying layers, i.e., layers 276 and 286 are linked together, as indicated by arrows 277.

The thicknesses of the layers in both pairs of linked models may be determined for the linked pre-processing and post-processing models in an iterative modeling process in which the thicknesses of the linked layers are changed together and the thicknesses of independently variable layers can be independently changed until a best fit for both the pre-measurement and post-measurement are achieved. The new spectra for the models at each change may be independently calculated or located in a library. Where a library is used, the library look up for each model is constrained based on the linked layers, i.e., only a subset of the data need be searched when the model includes linked layers. The best fit is determined, e.g., using a mean square error (MSE) or goodness of fit (GOF) calculation or any other appropriate manner. A combined best fit for the pre-measurement and post-measurement models is used, where a user-defined weighting factor, e.g., of the MSE, is used for each measurement. A weighting factor of 0.5 is used for both measurements to consider each equally. Once the best fit for each pair of linked models is found, the model error as determined by the MSE calculation for each model is reported (steps 216 and 218) and compared to each other (step 220). The results from the post-measurement model with the smallest error are then reported as the model that most accurately describes the post-processing sample (step 220).

In some implementations, the results from the post-measurement model are compared to the desired target to determine if the sample has been adequately processed (step 222).

If the results do not match the target, i.e., the results that the sample has been under-polished, the process goes back to step 208 for additional processing of the sample. If the result does match the target, the process is finished (step 224). Of course, if the result indicates that the sample has been over-polished, the sample may be appropriately treated, i.e., rejected or re-processed. Additionally, the results from the measurement, which indicate the polish rate of the current sample, can be feedback to the processing equipment (step 226) to assist in the control of the processing of future samples.

Figure 5:
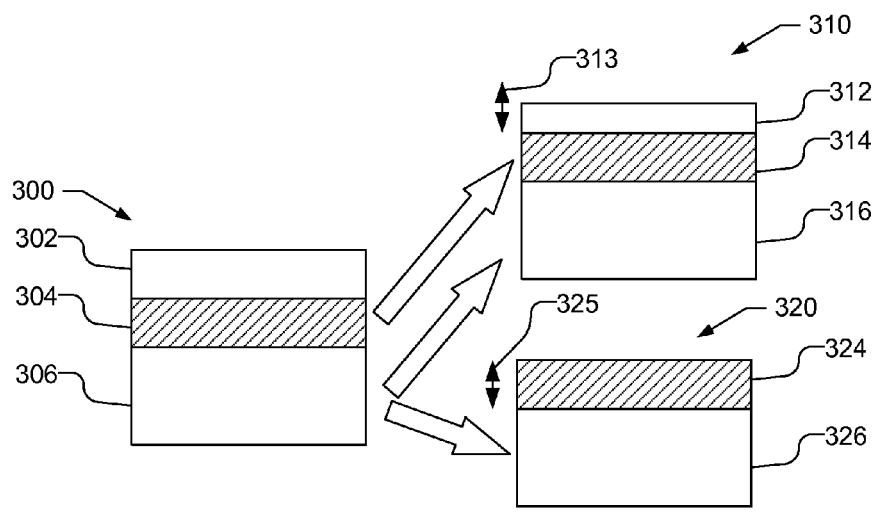
FIG. 5 illustrates another embodiment with multiple post-processing models.

In one embodiment, the results of the pre-measurement of the sample may be fed forward to the post-processing models. In one embodiment, a sample is measured prior to processing and modeled with a pre-processing model, as illustrated in FIG. 5. By way of example, the thickness of layers 302, 304 and 306 may be determined with the pre-processing model 300. It should be understood that additional or other parameters of the layers may be determined and fed forward to the post-processing models. After processing, a first post-processing model 310 and a second post-processing model 320 of the post-processed sample are produced. The measured thickness of the underlying layers 304 and 306 of the pre-processing model 300 are fed forward to the first post-processing model 310, which models the top layer 312 as an independent variable (as indicated by arrow 313) and constrains layers 314 and 316 to have the thickness determined in the pre-processing measurement (as indicated by arrows 315 and 316). The measured thickness of the underlying layer 306 of the pre-processing model 300 is also fed forward to the second post-processing model 320, which models the top layer 322 as having zero thickness, i.e., the top layer of the sample is presumed to be completely removed, and models the second layer 324 as an independent variable and constrains the layers 326 to have the thickness as determined in the pre-processing measurement. The post-processing model with, e.g., the smallest modeling error may then be considered to most accurately describe the post-processing sample.

It should be understood that non-modeling types of pre-measurements may be used to determine the desired parameters of the layers of the sample and, thus, the pre-measurement model 300 shown in FIG. 5 need not be used. Moreover, the values of the parameters for the pre-processing sample may be determined in various manners, such as an in-situ monitoring of the deposition of the layers on the sample. Further, because only the underlying layers are fed forward to the post-processing models, the pre-processing measurement (or in-situ monitoring) may be performed on the sample before the top layer 302 is deposited. Another manner of obtaining the values of the parameters for the layers in the pre-processing sample may also include measuring a plurality of samples and determining the process variation for the layer parameters based on the plurality of samples. Statistically based values generated from the determined process variation, such as the minima, mean, etc, can then be fed forward to the post-processing models 310 and 320.

It should be understood that while the embodiments described herein relate to CMP and the measurement of thickness of layers, the present invention is not limited thereto. For example, the present invention may be used with other processing techniques where a layer or portion of a layer is removed, such as etching. Further, the present invention may be used to determine any desired optical characteristic, such as n and k, with improved accuracy and precision as compared to conventional fitting processes.

It should be understood that the present invention is described with only a single top layer being removed for the sake of simplicity and that, if desired, the present invention may be used where multiple layers are removed simultaneously. By way of example, where multiple top layers are removed, additional linked pre-processing and post-processing models may be used, with each additional post-processing model fixing the thickness of a different top layer to zero, while modeling the next underlying layer as an independent variable and constraining the parameters of any underlying layers to that of the linked pre-processing model.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
    processing a sample having at least a first layer and a second layer that is under the first layer to at least partially remove the first layer to produce a post-processed sample;
    performing a post-processing measurement of the post-processed sample;
    generating a first model of the post-processing sample, wherein the first model models the first layer as an independent variable and models the second layer;
    generating a second model of the post-processing sample, wherein the second model models the first layer as having a thickness of zero and models the second layer as an independent variable;
    using the post processing measurement, the first model and the second model to determine at least one desired parameter of the post-processed sample.

2. The method of claim 1, wherein using the post processing measurement, the first model and the second model comprises performing non-linear regression.

3. The method of claim 1, wherein using the post-processing measurement and the first model and the second model comprises using a library.

4. The method of claim 1, wherein using the post-processing measurement and the first model and the second model comprises:
    determining a first modeling error for the first model;
    determining a second modeling error for the second model;
    comparing the first modeling error and the second modeling error to determine the smallest modeling error; and
    reporting the results for the at least one desired parameter of the post-processed sample based on the smallest modeling error.

5. The method of claim 1, wherein the sample before processing is a pre-processed sample, the method further comprising:
    performing a pre-processing measurement of the pre-processed sample; and
    using the pre-processing measurement and the post-processing measurement and the first model and the second model to determine at least one desired parameter of the post-processed sample.

6. The method of claim 1, wherein the sample before processing is a pre-processed sample, the method further comprising:
    performing a pre-processing in-situ monitoring of the pre-processed sample; and
    using the pre-processing in-situ monitoring and post-processing measurement and the first model and the second model to determine at least one desired parameter of the post-processed sample.

7. The method of claim 1, further comprising:
measuring a second layer on a plurality of samples;
determining a process variation for a parameter of the second layer on the plurality of samples;
generating statistics of the process variation; and
using the statistics of the process variation and the post-processing measurement and the first model and the second model to determine at least one desired parameter of the post-processed sample.

8. The method of claim 5, further comprising:
generating a third model of the pre-processed sample, wherein the third model models the first layer as an independent variable and models the second layer as an independent variable, wherein the second layer in the first model is constrained to have the same parameters as the second layer in the third model.

9. The method of claim 8, wherein the sample has a third layer that is under the second layer, the first model includes a third layer, the second model includes a third layer, and the third model includes a third layer; wherein the third layer of both the first model and the second model is constrained to have the same parameters as the third layer of the third model.

10. The method of claim 8, wherein the parameters of the second layer of the first model that are constrained to be the same parameters as the second layer in the third model include the layer thickness and optical characteristics.

11. The method of claim 1, wherein the at least one desired parameter of the post-processed sample is selected from a thicknesses and at least one optical characteristic of the first layer and second layer of the sample.

12. The method of claim 11, wherein the at least one optical characteristic includes the refractive index and the extinction coefficient or parameters in parametric models of the refractive index and the extinction coefficient.

13. The method of claim 8, wherein using the pre-processing measurement and the post-processing measurement and the first model and the second model comprises performing a library look up for each of the first model, second model, and third model, wherein the library look up is constrained so that the second layer in the first model and the second layer in the third model have the same parameters.

14. The method of claim 5, wherein performing a pre-processing measurement of the sample comprises:
producing radiation that is incident on the sample; and
collecting a first set of radiation after it interacts with the sample;
wherein performing a post-processing measurement of the post-processed sample comprises:
producing radiation that is incident on the sample; and
collecting a second set of radiation after it interacts with the post-processed sample.

15. The method of claim 14, wherein the pre-processing measurement and the post-processing measurement are performed using one of a spectroscopic reflectometer, ellipsometer, and scatterometer.

16. The method of claim 1, wherein processing the sample to at least partially remove the first layer comprises performing at least one of a chemical mechanical polishing process and an etching process.

17. The method of claim 4, further comprising using the reported results to adjust the processing of subsequent samples.

18. The method of claim 8, wherein the sample has at least one additional layer over the first layer, wherein a corresponding number of models are used for each additional layer.

19. A method comprising:
processing a sample having multiple layers to at least partially remove the top layer to produce a post-processed sample;
measuring the post-processed sample using a non-contact measurement;
generating multiple post-processing models of the post-processed sample, each of the multiple post-processing models modeling the post-processed sample with a different top layer, wherein the top layer of each of the multiple post-processing models is an independent variable; and
using the post-processing measurement and the multiple post-processing models to determine at least one desired parameter of the post-processed sample.

20. The method of claim 19, further comprising:
determining a parameter of at least one underlying layer of the pre-processed sample; and
using the determined parameter of at least one underlying layer of the pre-processed sample with the post-processing measurement and the multiple post-processing models to determine at least one desired parameter of the post-processed sample.

21. The method of claim 19, further comprising:
measuring the sample prior to processing;
generating at least one pre-processing model; and
using the measurement of the sample prior to processing and the at least one pre-processing model along with the post-processing measurement and the multiple post-processing models to determine at least one desired parameter of the post-processed sample.

22. The method of claim 21, wherein using the measurement of the sample prior to processing and the at least one pre-processing model along with the post-processing measurement and the multiple post-processing models to determine at least one desired parameter of the post-processed sample comprises:
using the measurement of the sample prior to processing and the at least one pre-processing model to determine a parameter of at least one layer of the pre-processed sample; and
using the determined parameter of at least one layer of the pre-processed sample with the post-processing measurement and the multiple post-processing models to determine at least one desired parameter of the post-processed sample.

23. The method of claim 21, further comprising:
generating multiple pre-processing models, wherein each of the multiple post-processing models of the post-processed sample is paired with a pre-processing model;
wherein using the measurement of the sample prior to processing and the at least one pre-processing model along with the post-processing measurement and the multiple post-processing models to determine at least one desired parameter of the post-processed sample comprises:
constraining at least one underlying layer in each pair of pre-processing model and post-processing model to have the same parameters; wherein at least the top layer of each pre-processing model is an independent variable.

24. The method of claim 19, wherein using the post-processing measurement and the multiple post-processing models comprises at least one of performing non-linear regression and using a library.

25. The method of claim 19, wherein using the post-processing measurement and the multiple post-processing models comprises:

determining multiple modeling errors using at least the multiple post-processing models;

comparing the multiple modeling errors to determine the smallest modeling error; and reporting the results for the at least one desired parameter of the post-processed sample based on the smallest modeling error.

* * * * *